3,288,880
CONDENSATION POLYMERS, FOR STABILIZING POLYMERIC STRUCTURES, COMPOSED OF HYDROXYAROMATIC KETONE, ALDEHYDE, AND PHENOL
Stanley Tocker, Wilmington, Del., assignor to E. I. du Pont de Nemours and Company, Wilmington, Del., a corporation of Delaware
No Drawing. Filed Sept. 8, 1964, Ser. No. 395,080
21 Claims. (Cl. 260—828)

This application is a continuation-in-part of my copending application Serial No. 307,783, filed September 10, 1963.

This invention relates to organic polymeric shaped structures of polymers of ethylenically unsaturated monomers and particularly to the production of shaped articles, such as films, of polymers of ethylenically unsaturated monomers, stabilized against the degrading action of ultraviolet light and heat, and to novel light- and heat-stabilized compositions, and light- and heat-stabilizing agents.

Many organic polymeric structures such as structures of polymers of ethylenically unsaturated monomers, e.g., polyethylene, polypropylene and the like, deteriorate rapidly when subjected to sunlight. These materials are particularly sensitive to ultraviolet light in the wave length range of 2900–3800 A. Exposure to the ultraviolet light tends to embrittle the structures and reduce the level of their electrical and physical properties substantially, and in some instances imparts an undesirable color to the polymeric structure.

Another problem associated with many of these organic polymeric structures is concerned with the shaping operation wherein the organic polymeric resin is converted into a desired shape or form depending upon the particular use envisaged. For the most part, these shaping operations are carried out at elevated temperatures such as for melt extrusion and it is found that many polymeric resins such as the polyolefins as well as haloolefin polymers are unstable and are subject to degradation when subjected to the elevated temperatures required for many shaping operations.

It is known to incorporate various ultraviolet stabilizing agents in polymeric resins in order to render the finished articles more resistant to the degradative action of ultraviolet light. Similarly, it is also known to incorporate various materials or agents in the resins in order to improve their resistance to thermal degradation. In some instances, it has been found that synergistic effects may be provided if both an ultraviolet stabilizing agent and a thermal stabilizing agent are incorporated in the particular polymeric resin to be shaped and to be subjected to outdoor use. While the use of such combinations as these does, for the most part, lend some improvement to the characteristics of polymeric resins such as polyolefins in these particular aspects, the overall performance of various combinations of agents both with respect to thermal stabilization as well as stabilization toward degradation by the action of ultraviolet light still leaves much to be desired.

It is therefore an object of this invention to provide agents which will afford satisfactory protection for shaped structures of polymers of ethylenically unsaturated monomers against degradation by the action of ultraviolet light. It is a further object of this invention to provide agents which will also function as satisfactory thermal stabilizers for polymers of ethylenically unsaturated monomers. A still further object of this invention is to provide shaped structures which are both resistant to the degradation of ultraviolet light and to thermal degradation. It is a still further object to provide polymeric compositions which will afford essentially permanent retention of these desirable characteristics. The foregoing and related objects will more clearly appear from the following detailed description.

These objects are realized by the present invention which, briefly stated, comprises homogeneously blending at an elevated temperature a mixture of a polymer of an ethylenically unsaturated monomer and from 0.1 to 10% by weight, based on the total weight of the mixture, of a soluble, thermoplastic, linear organic polymer consisting essentially of recurring groups A, B, and C of the formulae

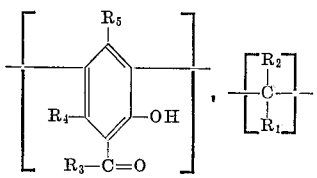

and

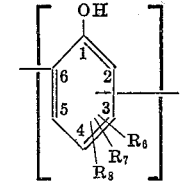

respectively, wherein $R_1$ and $R_2$ are selected from the group consisting of hydrogen, alkyl groups having from 1 to 6 carbon atoms, chloroalkyl, furyl, vinyl, propenyl and phenyl; $R_3$ is selected from the group consisting of alkyl groups having from 1 to 6 carbon atoms and aryl groups; $R_4$ and $R_5$ are selected from the group consisting of hydrogen, hydroxyl, halogen, alkyl and alkoxy groups; the substituent groups $R_6$, $R_7$ and $R_8$ are selected from the group consisting of hydrogen, hydroxyl, halogen, aryl, aryloxy, alkyl and cycloalkyl, at least one group of which is an alkyl group when said ethylenically unsaturated monomer is an alpha olefin; wherein the recurring groups A and C are joined to similar groups and to each other by means of the recurring group B, wherein the points of attachment of group C are at position 6 and at no more than one other position; wherein the molar ratio of $A:B:C$ is 0.5–1.5:2:1.5–0.5 and wherein the polymer has a molecular weight of at least 400, and thereafter forming the resulting homogeneous composition into a shaped structure, e.g., a film.

The soluble, thermoplastic, linear organic polymer which functions as the light and heat stabilizing agent of this invention is prepared by condensing an ortho-hydroxy substituted phenone, preferably o-hydroxybenzophenone, with a carbonyl compound, preferably formaldehyde and a para-ssubstituted phenol, preferably p-dodecylphenol, preferably in the molar ratio of $A:B:C$ of 1:2:1. The reaction is best carried out under acidic conditions, employing a reasonably strong organic condensation catalyst such as formic acid, glycolic acid, and chloroacetic acid, or an inorganic acid such as sulfuric or phosphoric acid. The several ingredients are warmed gently to form a homogeneous reaction medium and thereafter they are heated to temperatures in the range of 100 to 125° C., depending upon the particular ingredients and the solvents that may be employed, for periods of time ranging from a few minutes to 24 hours or more after which the reaction mass is cooled to room temperature and the product is extracted with a solvent such as benzene or toluene. Then organic solution is washed with water, dried and evaporated to isolate the polymer. Ordinarily, when the reaction is carried out at temperatures around 100 to 115° C. a sufficiently high molecular weight polymer is realized in a period of about 12 hours.

In place of the preferred o-hydroxybenzophenone, typical ketones which are suitable for preparing the stabilizing agent of this invention include 2-hydroxyacetophenone,
2,4-dihydroxybenzophenone,
2-hydroxy-4,6-dimethyl benzophenone,
2-hydroxy-4-chlorobenzophenone,
2-hydroxy-4-fluorobenzophenone,
2,2'-dihydroxybenzophenone,
2-hydroxy-4-methylbenzophenone,
2,4'-dihydroxybenzophenone,
2-hydroxy-4-methoxybenzophenone,
2-hydroxy-4,6-dimethoxybenzophenone.

Representative phenols other than the preferred p-dodecylphenol useful for purposes of this invention are p-tertiary-butylphenol,
p-t-heptylphenol,
p-octadecylphenol,
p-tetradecylphenol,
o-decylphenol,
6-dodecylresorcinol,
p-decyl-3,5-dichlorophenol,
5-decyl-2-methyl resorcinol,
p-chlorophenol,
p-octylphenol,
p-nonylphenol,
p-decylphenol,
alpha-naphthol,
beta-naphthol,
o-cresol,
m-cresol,
p-cresol p-hydroxylbiphenol,
2,5-dimethylphenol,
3,5-dimethylphenol,
2,3-dimethylphenol,
3,4-dimethylphenol,
2,5-dichlorophenol,
3,5-dichlorophenol,
2,3-dichlorophenol, resorcinol, hydroquinone and catechol. For stabilizing certain polymers such as polyvinyl fluoride, unsubstituted phenol can be used.

As the carbonyl compound there may be employed in place of formaldehyde, aldehydes such as acetaldehyde, propionaldehyde, trimethyl acetaldehyde, furfural, butyraldehyde, benzaldehyde, isobutyraldehyde, valeraldehyde, capronaldehyde, acrolein, and crotonaldehyde, and ketones such as acetone, methyl ethyl ketone, diethyl ketone and methyl isobutyl ketone.

The preferred stabilized polymeric compositions are those wherein the polymeric stabilizing agent is incorporated in a polyolefin such as polyethylene or polypropylene by blending, e.g., milling the ingredients in a rubber mill, at an elevated temperature to produce a homogeneous composition. Where thermal degradation is not a problem, the polymeric stabilizer may be employed as a coating on the shaped structure to stabilize the shaped structure against the degrading action of ultraviolet light. The polymeric stabilizer should constitute from 0.1% to 10% of the total weight of the stabilized compositions. If less than about 0.1% of stabilizer is employed a satisfactory light and heat stabilizing action will not be realized. On the other hand, amounts of stabilizer in excess of about 10% do not result in significant added improvement in light and thermal stability, and may alter the essential characteristics of the polymeric structure to be stabilized. Preferably, the stabilizer should constitute from 1 to 3%, by weight, of the blend.

The novel polymeric light and thermal stabilizing agents of this invention effectively afford protection as herein described for structures of any polymer of ethylenically unsaturated monomer. As typical examples of polymers which may be blended with the polymeric stabilizers in accordance with this invention there may be mentioned, in addition to polyethylene and polypropylene, haloethylene polymers such as polyvinyl fluoride, polyvinyl chloride, vinyl chloride/vinylidene chloride copolymers, as well as copolymers of alpha-olefins with other vinyl monomers such as vinyl acetate, methyl methacrylate, isoprene, etc.

The following specific examples of preferred embodiments are further illustrative of the principles and practice of this invention.

EXAMPLE 1

(a) *Preparation of polymer of formaldehyde, o-hydroxybenzophenone and para-decylphenol*

In a three-necked flask equipped with a thermometer, stirrer and reflux condenser, there was placed 6.8 grams of formic acid and 0.6 gram of paraformaldehyde. The mixture was heated at 50° C. with stirring until the paraformaldehyde dissolved. Thereafter, a mixture of 2 grams of o-hydroxybenzophenone and 2.3 grams of dodecylphenol was added rapidly and the resulting solution was stirred and heated at 110° C. for fourteen hours. The reactor was cooled to room temperature and the product was extracted with benzene. The benzene solution was washed with water, dried and evaporated, yielding a slight amber-colored resin. A test of the resin showed it to have ultraviolet absorption at 3400 A. Reprecipitation of the resin from benzene with methanol showed no reduction in the ultraviolet absorption, indicating the o-hydroxybenzophenone moiety was bound as part of the polymer. Molecular weight of the polymer (boiling point elevation in benzene) was 600.

(b) *Incorporation of stabilizer in polyethylene*

A blend of branched polyethylene ("Alathon" G[1]) with one percent by weight of the polymer of 1(a) above was prepared by milling on a rubber mill at 135° C. There was no tendency for the polymeric mixture to blush or exude from the polyethylene resin. Samples were pressed into 4 mil thick films and then aged in an air oven at an average temperature of 210° C. for 30 minutes. There was no indication of oxidation of the aged film, i.e., no increase in absorption in the 1700–1750 cm.$^{-1}$ infrared region indicative of oxidation to carbonyl groups. As a control, a sample of the branched polyethylene in which there had been incorporated 1.0 weight percent of "Santowhite Crystals"[2] showed a definite increase in infrared absorption under the same test conditions. The test films placed in an Atlas Weather-Ometer showed no degradation in physical properties after 2000 hours; in contrast, the control film containing the "Santowhite Crystals" showed evidence of cracking after only 300 hours exposure. Another control film containing 0.5 weight percent of "Santowhite" and 1.0 weight percent of 2 - hydroxy - 4 - dodecyloxy - benzophenone cracked on flexing after 1000 hours of exposure.

(c) *Incorporation of stabilizer in polypropylene*

The condensation polymer of 1(a) was incorporated in polypropylene resin (Profax 6420[3]) as described in 1(b). The films pressed from these samples were then subjected to a thermal test comprising heating in an air oven at 135° C. for 12 hours. The film showed no evidence of degradation. In a comparable test, a control film containing "Santowhite Crystals" in essentially the same amount showed definite degradation.

EXAMPLES 2–6

Following the procedure of Example 1, condensation polymers were made from the ingredients A, B, and C listed in tabular form below. These polymers were incorporated in the test films of polymers indicated in the

[1] Du Pont registered trademark.
[2] Dialkyl phenyl sulfide, Monsanto Chemical Co.
[3] Hercules Powder Company.

table and were then subjected to thermal and ultraviolet light degradation tests as described in Example 1. The results were as follows:

| Example | Polymer | | | Evaluation in Polymer | | |
|---|---|---|---|---|---|---|
| | A | B | C | Polymer | Thermal [1] | Ultraviolet [2] |
| 2 | 2-hydroxyacetophenone | Formaldehyde | Dodecylphenol | PP | None | 5 |
| 3 | 2-hydroxy-4,6-dimethylbenzophenone | Acetone | t-Butylphenol | PE | ___do___ | 3 |
| 4 | 2-hydroxy-4-chlorobenzophenone | Trimethyl acetaldehyde | Decylphenol | PP | ___do___ | 4 |
| 5 | 2,4-dihydroxybenzophenone | Furfural | Octadecylphenol | PE | ___do___ | 4 |
| 6 | 2-hydroxy-4-chlorobenzophenone and 2,4-dihydroxybenzophenone | Chloral | 3,5-dichloro-4-methylphenol | PVCl | No discoloration | 3 |
| 7 | 2-hydroxy-4'-chlorobenzophenone | Butyraldehyde | 3,5-dichloro-4-methylphenol | PVCl | ___do___ | 3 |
| 8 | 2-hydroxy-4-methoxybenzophenone | Formaldehyde | 3,5-difluoro-4-methylphenol | PVF | ___do___ | [3] 3 |
| 9 | 2-hydroxy-4-methylbenzophenone | Formaldehyde and butyraldehyde | 2,5-dimethylphenol | E/VA | None | 3 |
| 10 | 2-hydroxy-4-methoxy-acetophenone | Benzaldehyde | Octylphenol | E/EA | ___do___ | 3 |
| 11 | 2-hydroxybenzophenone | Formaldehyde | Phenol | PVF | ___do___ | [3] 4 |

[1] Evidence of carbonyl formation —210° C./30 minutes; control polymer without stabilizer badly discolored under same test.
[2] Ratio of time for test film to degrade/time for control film (no agent) to degrade.
[3] Newspaper placed underneath film containing stabilizer; time to discolor paper noted and compared with similar time under film with no stabilizer.
PP—Polypropylene; PE—Polyethylene; PVCl—Polyvinyl Chloride; PVF—Polyvinyl Fluoride; E/VA—Ethylene/Vinyl Acetate; E/EA—Ethylene/Ethyl Acetate; E/EA—Ethyl Acrylate.

The particular advantage of this invention is that there is provided a polymeric stabilizer whose retention in the polymer is essentially permanent. Furthermore, there is provided both thermal stabilization as well as stabilization toward the degradative action of ultraviolet light. This combination is more effective than combinations of a single thermal stabilizer and an ultraviolet light stabilizer with respect to thermal and ultraviolet light stabilization. The advantage of this in the forming and in the outdoor performance characteristics of the various polymeric structures, particularly those based on polyolefins, is obvious.

I claim:
1. A thermoplastic linear polymer consisting essentially of recurring groups A, B, and C of the formulae

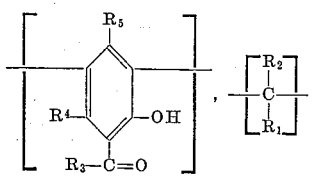

and

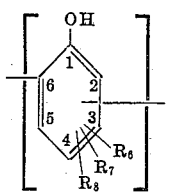

respectively, wherein $R_1$ and $R_2$ are selected from the group consisting of hydrogen, alkyl groups having from 1 to 6 carbon atoms, chloroalkyl, furyl, vinyl, propenyl and phenyl; $R_3$ is selected from the group consisting of alkyl groups having from 1 to 6 carbon atoms and aryl groups; $R_4$ and $R_5$ are selected from the group consisting of hydrogen, hydroxyl, halogen, alkyl and alkoxy groups; the substituent groups $R_6$, $R_7$ and $R_8$ are selected from the group consisting of hydrogen, hydroxyl, halogen, aryl, aryloxy, alkyl and cycloalkyl; wherein the recurring groups A and C are joined to similar groups and to each other by means of the recurring group B, wherein the points of attachment of group C are at position 6 and at no more than one other position; wherein the molar ratio of $A:B:C$ is 0.5–1.5:2:1.5–0.5 and wherein the polymer has a molecular weight of at least 400.

2. A thermoplastic linear polymer consisting essentially of recurring groups A, B, and C of the formulae

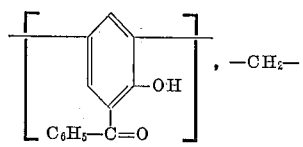

and

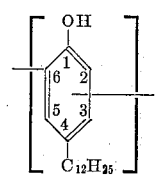

respectively, wherein the molar ratio of $A:B:C$ is 0.5–1.5:2:1.5–0.5 said polymer having a molecular weight of at least 400.

3. The polymer of claim 2 wherein the molar ratio $A:B:C$ is 1:2:1.

4. A composition of matter comprising essentially a homogeneous mixture of a polymer of an ethylenically unsaturated monomer and from 0.1 to 10% by weight, based on the total weight of the mixture of a thermoplastic linear polymer consisting essentially of recurring groups A, B, and C of the formulae

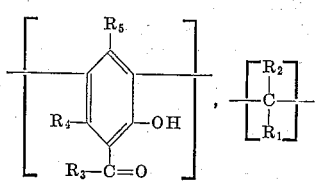

and

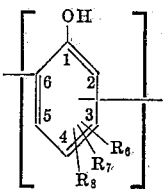

respectively, wherein $R_1$ and $R_2$ are selected from the group consisting of hydrogen, alkyl groups having from 1 to 6 carbon atoms, chloroalkyl, furyl, vinyl, propenyl and phenyl; $R_3$ is selected from the group consisting of alkyl groups having from 1 to 6 carbon atoms and aryl groups; R₄ and R₅ are selected from the group consisting of hydrogen, hydroxyl, halogen, alkyl and alkoxy groups; the substituent groups R₆, R₇ and R₈₈ are selected from the group consisting of hydrogen, hydroxyl, halogen, aryl, aryloxy, alkyl and cycloalkyl, at least one group of which is an alkyl group when said ethylenically unsaturated monomer is an alpha olefin; wherein the recurring groups A and C are joined to similar groups and to each other by means of the recurring group B, wherein the points of attachment of group C are at position 6 and at no more than one other position; wherein the molar ratio of $A:B:C$ is 0.5–1.5:2:1.5–0.5 and wherein the polymer has a molecular weight of at least 400.

5. A composition of matter comprising essentially a homogeneous mixture of a polymer of an ethylenically unsaturated monomer and from 1 to 3% by weight, based on the total weight of the mixture of a thermoplastic linear polymer consisting essentially of recurring groups A, B, and C of the formulae

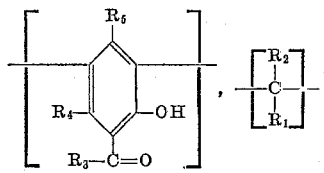

and

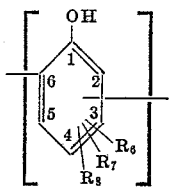

respectively, wherein R₁ and R₂ are selected from the group consisting of hydrogen, alkyl groups having from 1 to 6 carbon atoms, chloroalkyl, furyl, vinyl, propenyl and phenyl; R₃ is selected from the group consisting of alkyl groups having from 1 to 6 carbon atoms and aryl groups; R₄ and R₅ are selected from the group consisting of hydrogen, hydroxyl, halogen, alkyl and alkoxy groups; the substituent groups R₆, R₇ and R₈ are selected from the group consisting of hydrogen, hydroxyl, halogen, aryl, aryloxy, alkyl and cycloalkyl, at least one group of which is an alkyl group when said ethylenically unsaturated monomer is an alpha olefin; wherein the recurring groups A and C are joined to similar groups and to each other by means of the recurring group B, wherein the points of attachment of group C are at position 6 and at no more than one other position; wherein the molar ratio of $A:B:C$ is 0.5–1.5:2:1.5–0.5 and wherein the polymer has a molecular weight of at least 400.

6. The composition of claim 4 wherein the polymer of an ethylenically unsaturated monomer is selected from the group consisting of polymers of alpha olefins, haloolefins, vinyl esters and acrylic esters.

7. The composition of claim 4 wherein the polymer of an ethylenically unsaturated monomer is polyethylene.

8. The composition of claim 4 wherein the polymer of an ethylenically unsaturated monomer is polypropylene.

9. The composition of claim 4 wherein the polymer of an ethylenically unsaturated monomer is polyvinyl fluoride.

10. The composition of claim 4 wherein the recurring groups A, B, and C are of the formulae

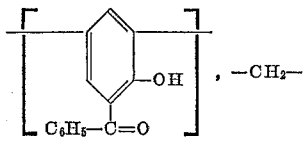

and

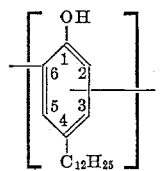

respectively.

11. The composition of claim 10 wherein the polymer of an ethylenically unsaturated monomer is polyethylene.

12. The composition of claim 10 wherein the polymer of an ethylenically unsaturated monomer is polypropylene.

13. A shaped structure comprised essentially of a homogeneous mixture of a polymer of an ethylenically unsaturated monomer and from 0.1 to 10% by weight, based on the total weight of the mixture of a thermoplastic linear polymer consisting essentially of recurring groups A, B, and C of the formulae

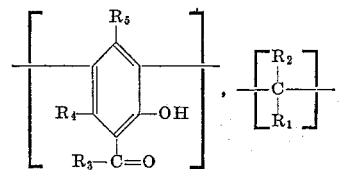

and

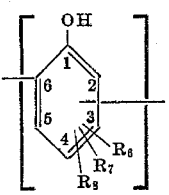

respectively, wherein R₁ and R₂ are selected from the group consisting of hydrogen, alkyl groups having from 1 to 6 carbon atoms, chloroalkyl, furyl, vinyl, propenyl and phenyl; R₃ is selected from the group consisting of alkyl groups having from 1 to 6 carbon atoms and aryl groups; R₄ and R₅ are selected from the group consisting of hydrogen, hydroxyl, halogen, alkyl and alkoxy groups; the substituent groups R₆, R₇ and R₈ are selected from the group consisting of hydrogen, hydroxyl, halogen, aryl, aryloxy, alkyl and cycloalkyl, at least one group of which is an alkyl group when said ethylenically unsaturated monomer is an alpha olefin; wherein the recurring groups A and C are joined to similar groups and to each other by means of the recurring group B, wherein the points of attachment of group C are at position 6 and at no more than one other position; wherein the molar ratio of $A:B:C$ is 0.5–1.5:2:1.5–0.5 and wherein the polymer has a molecular weight of at least 400.

14. A self-supporting film comprised essentially of a homogeneous mixture of a polymer of an ethylenically unsaturated monomer and from 0.1 to 10% by weight, based on the total weight of the mixture of a thermoplastic linear polymer consisting essentially of recurring groups A, B, and C of the formulae

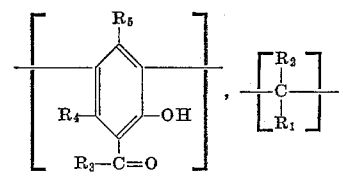

and

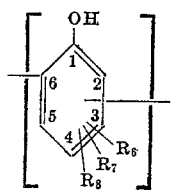

respectively, wherein $R_1$ and $R_2$ are selected from the group consisting of hydrogen, alkyl groups having from 1 to 6 carbon atoms, chloroalkyl, furyl, vinyl, propenyl and phenyl; $R_3$ is selected from the group consisting of alkyl groups having from 1 to 6 carbon atoms and aryl groups; $R_4$ and $R_5$ are selected from the group consisting of hydrogen, hydroxyl, halogen, alkyl and alkoxy groups; the substituent groups $R_6$, $R_7$ and $R_8$ are selected from the group consisting of hydrogen, hydroxyl, halogen, aryl, aryloxy, alkyl and cycloalkyl, at least one group of which is an alkyl group when said ethylenically unsaturated monomer is an alpha olefin; wherein the recurring groups A and C are joined to similar groups and to each other by means of the recurring group B, wherein the points of attachment of group C are at position 6 and at no more than one other position; wherein the molar ratio of $A:B:C$ is 0.5–1.5:2:1.5–0.5 and wherein the polymer has a molecular weight of at least 400.

15. A self-supporting film comprised essentially of a homogeneous mixture of polyethylene and from 0.1 to 10% by weight, based on the total weight of the mixture of a thermoplastic linear polymer consisting essentially of recurring groups A, B, and C of the formulae

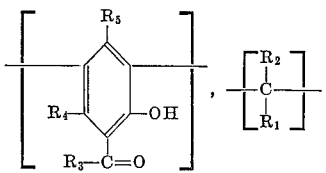

and

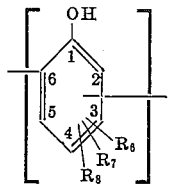

respectively, wherein $R_1$ and $R_2$ are selected from the group consisting of hydrogen, alkyl groups having from 1 to 6 carbon atoms, chloroalkyl, furyl, vinyl, propenyl and phenyl; $R_3$ is selected from the group consisting of alkyl groups having from 1 to 6 carbon atoms and aryl groups; $R_4$ and $R_5$ are selected from the group consisting of hydrogen, hydroxyl, halogen, alkyl and alkoxy groups; the substituent groups $R_6$, $R_7$ and $R_8$ are selected from the group consisting of hydrogen, hydroxyl, halogen, aryl, aryloxy, alkyl and cycloalkyl, at least one group of which is an alkyl group; wherein the recurring groups A and C are joined to similar groups and to each other by means of the recurring group B, wherein the points of attachment of group C are at position 6 and at no more than one other position; wherein the molar ratio of $A:B:C$ is 0.5–1.5:2:1.5–0.5 and wherein the polymer has a molecular weight of at least 400.

16. The film of claim 15 wherein the recurring groups A, B, and C are of the formulae

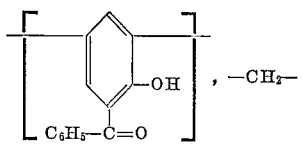

and

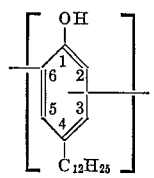

respectively.

17. A self-supporting film comprised essentially of a homogeneous mixture of polypropylene and from 0.1 to 10% by weight, based on the total weight of the mixture of a thermoplastic linear polymer consisting essentially of recurring groups A, B, and C of the formulae

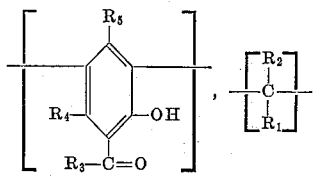

and

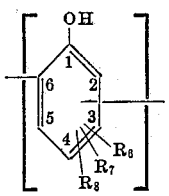

respectively, wherein $R_1$ and $R_2$ are selected from the group consisting of hydrogen, alkyl groups having from 1 to 6 carbon atoms, chloroalkyl, furyl, vinyl, propenyl and phenyl; $R_3$ is selected from the group consisting of alkyl groups having from 1 to 6 carbon atoms and aryl groups; $R_4$ and $R_5$ are selected from the group consisting of hydrogen, hydroxyl, halogen, alkyl and alkoxy groups; the substituent groups $R_6$, $R_7$ and $R_8$ are selected from the group consisting of hydrogen, hydroxyl, halogen, aryl, aryloxy, alkyl and cycloalkyl, at least one group of which is an alkyl group; wherein the recurring groups A and C are joined to similar groups and to each other by means of the recurring group B, wherein the points of attachment of group C are at position 6 and at no more than one other position; wherein the molar ratio of $A:B:C$ is 0.5–1.5:2:1.5–0.5 and wherein the polymer has a molecular weight of at least 400.

18. The film of claim 17 wherein the recurring groups A, B, and C are of the formulae

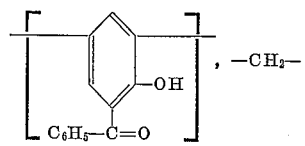

and

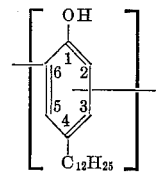

respectively.

19. A process for forming a self-supporting film which comprises blending at an elevated temperature a mixture of a polymer of an ethylenically unsaturated monomer and from 0.1 to 10% by weight, based on the total weight of the mixture of a thermoplastic linear polymer consisting essentially of recurring groups A, B, and C of the formulae

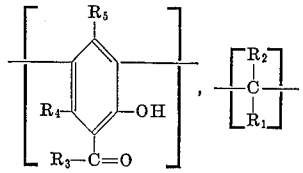

and

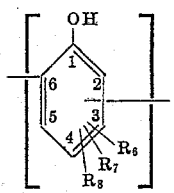

respectively, wherein $R_1$ and $R_2$ are selected from the group consisting of hydrogen, alkyl groups having from 1 to 6 carbon atoms, chloroalkyl, furyl, vinyl, propenyl and phenyl; $R_3$ is selected from the group consisting of alkyl groups having from 1 to 6 carbon atoms and aryl groups; $R_4$ and $R_5$ are selected from the group consisting of hydrogen, hydroxyl, halogen, alkyl and alkoxy groups; the substituent groups $R_6$, $R_7$ and $R_8$ are selected from the group consisting of hydrogen, hydroxyl, halogen, aryl, aryloxy, alkyl and cycloalkyl, at least one group of which is an alkyl group when said ethylenically unsaturated monomer is an alpha olefin; wherein the recurring groups A and C are joined to similar groups and to each other by means of the recurring group B, wherein the points of attachment of Group C are at position 6 and at no more than one other position; wherein the molar ratio of $A:B:C$ is $0.5-1.5:2:1.5-0.5$ and wherein the polymer has a molecular weight of at least 400, to form a homogeneous single phase composition, and thereafter extruding said composition in the form of film.

20. The process of claim 19 wherein the polymer of ethylenically unsaturated monomer is polyethylene.

21. The process of claim 19 wherein the polymer of ethylenically unsaturated monomer is polypropylene.

References Cited by the Examiner

UNITED STATES PATENTS

| | | | |
|---|---|---|---|
| 1,614,172 | 1/1927 | Aman et al. | 260—50 |
| 2,241,422 | 5/1941 | Rosenblum | 260—50 |

MURRAY TILLMAN, *Primary Examiner.*

P. LIEBERMAN, *Assistant Examiner.*